United States Patent
Yurochko et al.

(10) Patent No.: US 9,142,369 B2
(45) Date of Patent: Sep. 22, 2015

(54) STACK ASSEMBLY FOR IMPLEMENTING KEYPADS ON MOBILE COMPUTING DEVICES

(75) Inventors: Michael Yurochko, Los Gatos, CA (US); Arthur Zarnowitz, San Jose, CA (US); Peter Skillman, San Carlos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1105 days.

(21) Appl. No.: 11/080,375

(22) Filed: Mar. 14, 2005

(65) Prior Publication Data

US 2006/0204303 A1    Sep. 14, 2006

(51) Int. Cl.
- *G06F 3/02* (2006.01)
- *H01H 13/83* (2006.01)
- *H01H 13/85* (2006.01)
- *H04M 1/22* (2006.01)

(52) U.S. Cl.
CPC ............. *H01H 13/83* (2013.01); *G06F 3/0202* (2013.01); *H01H 13/85* (2013.01); *H04M 1/22* (2013.01)

(58) Field of Classification Search
None
See application file for complete search history.

(56) References Cited

U.S. PATENT DOCUMENTS

| | | | |
|---|---|---|---|
| 1,718,694 A | 6/1929 | Kurowski | |
| 3,369,643 A | 2/1968 | Avgerinos et al. | |
| 3,396,827 A | 8/1968 | Harwell | |
| 3,744,034 A | 7/1973 | Paul | |
| 3,937,952 A | 2/1976 | Ripley et al. | |
| 4,022,993 A | 5/1977 | Shattuck | |
| 4,060,703 A * | 11/1977 | Everett, Jr. | 200/5 A |
| 4,180,336 A | 12/1979 | Lonsdale | |
| 4,196,666 A | 4/1980 | Hiki et al. | |
| 4,237,351 A | 12/1980 | Boulanger et al. | |
| 4,320,268 A * | 3/1982 | Brown | 200/5 A |
| 4,359,612 A | 11/1982 | Rooney | |
| 4,359,613 A | 11/1982 | Rooney | |
| 4,559,705 A | 12/1985 | Hodge et al. | |
| 4,564,751 A | 1/1986 | Alley et al. | |
| RE32,419 E | 5/1987 | Rooney | |
| 4,679,951 A | 7/1987 | King et al. | |
| 4,762,227 A | 8/1988 | Patterson | |
| 4,802,210 A | 1/1989 | Spencer et al. | |

(Continued)

FOREIGN PATENT DOCUMENTS

DE    10203400    6/2003
EP    0760291 A2    3/1997

(Continued)

OTHER PUBLICATIONS

"Nokia 9500 Up Close", from www.phonescoop.com, Jun. 27, 2006, 2 pages.

(Continued)

*Primary Examiner* — Jill Culler
(74) *Attorney, Agent, or Firm* — Mahamedi Paradice LLP

(57) ABSTRACT

A stack assembly for use with a mobile computing device. In one embodiment, the stack assembly includes an electrical contact layer, and actuation member layer, and an illumination layer. The electrical contact layer includes a plurality of contact elements. The actuation member layer includes a plurality of actuation members are, wherein each actuation member is aligned so that an axial movement of that member causes a corresponding one of the plurality of contact elements to actuate. The illumination layer is configured to emit light to the keypad.

24 Claims, 8 Drawing Sheets

(56) References Cited

U.S. PATENT DOCUMENTS

| | | | |
|---|---|---|---|
| 4,847,798 A | 7/1989 | Kurashima | |
| 4,860,372 A | 8/1989 | Kuzunuki et al. | |
| 4,916,441 A | 4/1990 | Gombrich | |
| 4,972,051 A | 11/1990 | Hodsdon | |
| 4,972,496 A | 11/1990 | Sklarew | |
| D312,628 S | 12/1990 | Yokoi et al. | |
| D313,401 S | 1/1991 | Tanabe | |
| D313,413 S | 1/1991 | Langton | |
| 4,994,992 A | 2/1991 | Lapeyre | |
| 5,002,184 A | 3/1991 | Lloyd | |
| 5,040,296 A | 8/1991 | Yerger | |
| 5,049,862 A | 9/1991 | Dao et al. | |
| 5,067,573 A | 11/1991 | Uchida | |
| 5,107,739 A | 4/1992 | Muramatsu et al. | |
| 5,128,829 A | 7/1992 | Loew | |
| 5,138,119 A * | 8/1992 | Demeo | 200/5 A |
| 5,165,415 A | 11/1992 | Wallace et al. | |
| 5,180,891 A | 1/1993 | Trumbo | |
| 5,181,029 A | 1/1993 | Kim | |
| 5,205,017 A | 4/1993 | Wang | |
| 5,231,381 A | 7/1993 | Duwaer | |
| 5,236,199 A | 8/1993 | Thompson, Jr. | |
| 5,253,142 A | 10/1993 | Weng | |
| 5,274,371 A | 12/1993 | Yang et al. | |
| 5,280,283 A | 1/1994 | Raasch et al. | |
| 5,283,862 A | 2/1994 | Lund | |
| 5,305,394 A | 4/1994 | Tanaka | |
| D355,165 S | 2/1995 | Sakaguchi et al. | |
| 5,389,745 A | 2/1995 | Sakamoto | |
| 5,401,917 A | 3/1995 | Yoshida et al. | |
| 5,401,927 A | 3/1995 | Lundell et al. | |
| 5,410,141 A | 4/1995 | Koenck et al. | |
| 5,426,449 A | 6/1995 | Danziger | |
| D359,920 S | 7/1995 | Sakamoto | |
| 5,430,248 A | 7/1995 | Levy | |
| 5,434,929 A | 7/1995 | Beernink et al. | |
| D361,562 S | 8/1995 | Beltz | |
| 5,444,192 A | 8/1995 | Shetye et al. | |
| 5,448,433 A | 9/1995 | Morehouse et al. | |
| 5,452,371 A | 9/1995 | Bozinovic et al. | |
| 5,457,454 A | 10/1995 | Sugano | |
| D366,463 S | 1/1996 | Ive et al. | |
| 5,489,924 A | 2/1996 | Shima et al. | |
| D368,079 S | 3/1996 | Ive et al. | |
| 5,500,643 A | 3/1996 | Grant | |
| 5,506,749 A | 4/1996 | Matsuda | |
| 5,515,045 A | 5/1996 | Tak et al. | |
| 5,515,763 A | 5/1996 | Vandervoort | |
| 5,528,743 A | 6/1996 | Tou et al. | |
| 5,530,234 A | 6/1996 | Loh et al. | |
| 5,534,892 A | 7/1996 | Tagawa | |
| 5,548,477 A | 8/1996 | Kumar et al. | |
| 5,550,715 A | 8/1996 | Hawkins | |
| 5,555,157 A | 9/1996 | Moller et al. | |
| 5,563,631 A | 10/1996 | Masunaga | |
| 5,564,850 A | 10/1996 | Nagaoka | |
| 5,576,502 A | 11/1996 | Fukushima et al. | |
| 5,606,712 A | 2/1997 | Hidaka | |
| 5,611,031 A | 3/1997 | Hertzfeld et al. | |
| 5,615,284 A | 3/1997 | Rhyne et al. | |
| 5,621,817 A | 4/1997 | Bozinovic et al. | |
| 5,622,789 A | 4/1997 | Young | |
| 5,630,148 A | 5/1997 | Norris | |
| 5,635,682 A | 6/1997 | Cherdak et al. | |
| 5,638,257 A | 6/1997 | Kumar et al. | |
| 5,642,110 A | 6/1997 | Raasch et al. | |
| D381,021 S | 7/1997 | Williams et al. | |
| 5,646,649 A | 7/1997 | Iwata et al. | |
| 5,657,459 A | 8/1997 | Yanagisawa et al. | |
| 5,661,641 A | 8/1997 | Shindo | |
| D383,756 S | 9/1997 | Henderson et al. | |
| 5,682,182 A | 10/1997 | Tsubodaka | |
| 5,698,822 A | 12/1997 | Haneda et al. | |
| D390,509 S | 2/1998 | Antzinas et al. | |
| 5,717,565 A | 2/1998 | Raasch | |
| D392,968 S | 3/1998 | Johansson | |
| 5,737,183 A | 4/1998 | Kobayashi et al. | |
| D394,449 S | 5/1998 | Shimizu | |
| 5,757,681 A | 5/1998 | Suzuki et al. | |
| 5,760,347 A | 6/1998 | Notarianni et al. | |
| 5,767,464 A | 6/1998 | Dyer et al. | |
| 5,786,061 A | 7/1998 | Banfield | |
| 5,797,482 A * | 8/1998 | LaPointe et al. | 200/314 |
| D398,307 S | 9/1998 | Collins | |
| 5,805,157 A | 9/1998 | Bertram et al. | |
| 5,805,402 A | 9/1998 | Maue et al. | |
| 5,810,461 A | 9/1998 | Ive et al. | |
| 5,818,437 A | 10/1998 | Grover et al. | |
| 5,821,510 A | 10/1998 | Cohen et al. | |
| 5,825,353 A | 10/1998 | Will | |
| 5,831,555 A | 11/1998 | Yu et al. | |
| 5,831,613 A | 11/1998 | Johnston et al. | |
| 5,832,764 A | 11/1998 | Girard | |
| 5,841,901 A | 11/1998 | Arai et al. | |
| D402,572 S | 12/1998 | Han | |
| 5,847,336 A * | 12/1998 | Thornton | 200/5 A |
| 5,848,298 A | 12/1998 | Steere, Jr. et al. | |
| 5,874,697 A | 2/1999 | Selker et al. | |
| 5,889,512 A | 3/1999 | Moller et al. | |
| D408,021 S | 4/1999 | Haitami et al. | |
| 5,892,503 A | 4/1999 | Kim | |
| D411,179 S | 6/1999 | Toyosato | |
| D411,181 S | 6/1999 | Tamaki et al. | |
| 5,913,629 A | 6/1999 | Hazzard | |
| 5,914,708 A | 6/1999 | La Grange et al. | |
| 5,915,228 A | 6/1999 | Kunihiro et al. | |
| 5,941,648 A | 8/1999 | Robinson et al. | |
| 5,942,177 A | 8/1999 | Banfield | |
| 5,949,408 A | 9/1999 | Kang et al. | |
| 5,953,205 A | 9/1999 | Kambayashi et al. | |
| 5,973,621 A | 10/1999 | Levy | |
| D416,001 S | 11/1999 | Tal et al. | |
| D416,256 S | 11/1999 | Griffin et al. | |
| 5,975,711 A | 11/1999 | Parker et al. | |
| 5,995,026 A | 11/1999 | Sellers | |
| D417,657 S | 12/1999 | Matsumoto | |
| 6,014,009 A | 1/2000 | Wierzbicki et al. | |
| D420,351 S | 2/2000 | Waldner | |
| D420,987 S | 2/2000 | Miyahara et al. | |
| 6,023,779 A | 2/2000 | Fullam et al. | |
| 6,034,685 A | 3/2000 | Kuriyama et al. | |
| D422,271 S | 4/2000 | Kawashima | |
| D423,468 S | 4/2000 | Jenkins | |
| 6,046,730 A | 4/2000 | Bowen et al. | |
| 6,049,796 A | 4/2000 | Siitonen et al. | |
| 6,050,735 A | 4/2000 | Hazzard | |
| 6,052,070 A | 4/2000 | Kivela et al. | |
| 6,052,279 A | 4/2000 | Friend et al. | |
| D424,533 S | 5/2000 | Kandalepas | |
| D426,236 S | 6/2000 | Kim et al. | |
| 6,088,022 A | 7/2000 | Rakoski | |
| 6,091,956 A | 7/2000 | Hollenberg | |
| 6,094,197 A | 7/2000 | Buxton et al. | |
| 6,100,875 A | 8/2000 | Goodman et al. | |
| 6,102,594 A | 8/2000 | Strom | |
| 6,102,721 A | 8/2000 | Seto et al. | |
| 6,103,979 A | 8/2000 | Motoyama et al. | |
| 6,107,997 A | 8/2000 | Ure | |
| 6,108,200 A | 8/2000 | Fullerton | |
| 6,115,248 A | 9/2000 | Canova et al. | |
| D432,511 S | 10/2000 | Eckholm | |
| D433,017 S | 10/2000 | Martinez | |
| 6,129,430 A | 10/2000 | Wu | |
| 6,148,261 A | 11/2000 | Obradovich et al. | |
| 6,151,012 A | 11/2000 | Bullister | |
| 6,151,206 A | 11/2000 | Kato et al. | |
| 6,157,323 A | 12/2000 | Tso et al. | |
| D436,591 S | 1/2001 | Abston et al. | |
| D436,963 S | 1/2001 | Kim et al. | |
| 6,170,024 B1 | 1/2001 | Wakeland et al. | |
| 6,172,620 B1 * | 1/2001 | Brick et al. | 341/22 |
| 6,178,087 B1 | 1/2001 | Cho et al. | |
| 6,181,284 B1 | 1/2001 | Madsen et al. | |
| 6,195,589 B1 | 2/2001 | Ketcham | |

(56) References Cited

U.S. PATENT DOCUMENTS

| | | | |
|---|---|---|---|
| D440,542 S | 4/2001 | Hawkins et al. | |
| 6,212,412 B1 | 4/2001 | Rogers et al. | |
| 6,217,183 B1* | 4/2001 | Shipman | 362/30 |
| D441,733 S | 5/2001 | Do et al. | |
| 6,239,968 B1 | 5/2001 | Kim et al. | |
| 6,243,789 B1 | 6/2001 | Hasbun et al. | |
| 6,246,169 B1* | 6/2001 | Pruvot | 313/506 |
| 6,249,276 B1 | 6/2001 | Ohno | |
| 6,266,240 B1 | 7/2001 | Urban et al. | |
| 6,278,442 B1 | 8/2001 | Griffin et al. | |
| 6,283,777 B1 | 9/2001 | Canova et al. | |
| D451,079 S | 11/2001 | Ali | |
| 6,348,878 B1 | 2/2002 | Tsubai | |
| D454,349 S | 3/2002 | Makidera et al. | |
| D454,849 S | 3/2002 | Eckholm | |
| 6,356,442 B1 | 3/2002 | Lunsford | |
| 6,374,277 B2 | 4/2002 | Vong et al. | |
| 6,377,685 B1 | 4/2002 | Krishnan | |
| D456,794 S | 5/2002 | Laverick et al. | |
| 6,396,482 B1 | 5/2002 | Griffin et al. | |
| D458,239 S | 6/2002 | Shim et al. | |
| D459,327 S | 6/2002 | Ali | |
| D460,068 S | 7/2002 | Lanzaro et al. | |
| 6,423,918 B1 | 7/2002 | King | |
| 6,452,588 B2 | 9/2002 | Griffin et al. | |
| 6,459,968 B1 | 10/2002 | Kochie | |
| 6,489,950 B1 | 12/2002 | Griffin et al. | |
| 6,507,336 B1 | 1/2003 | Lunsford | |
| 6,533,963 B1 | 3/2003 | Schleifstein et al. | |
| 6,535,199 B1 | 3/2003 | Canova, Jr. et al. | |
| D472,551 S | 4/2003 | Griffin | |
| D473,226 S | 4/2003 | Griffin | |
| D476,985 S | 7/2003 | Griffin | |
| D478,585 S | 8/2003 | Griffin | |
| 6,609,805 B1 | 8/2003 | Nelson | |
| 6,611,254 B1 | 8/2003 | Griffin et al. | |
| 6,611,255 B2 | 8/2003 | Griffin et al. | |
| 6,626,551 B2 | 9/2003 | Funamoto et al. | |
| 6,641,315 B2 | 11/2003 | King et al. | |
| 6,677,931 B2 | 1/2004 | Chi et al. | |
| 6,679,613 B2 | 1/2004 | Mabuchi | |
| 6,717,083 B2 | 4/2004 | Chen et al. | |
| D490,076 S | 5/2004 | Griffin | |
| 6,747,402 B2* | 6/2004 | Hato et al. | 313/305 |
| 6,750,414 B2 | 6/2004 | Sullivan | |
| 6,786,661 B2 | 9/2004 | King et al. | |
| 6,808,325 B2 | 10/2004 | King et al. | |
| D497,907 S | 11/2004 | Griffin | |
| 6,867,763 B2 | 3/2005 | Griffin et al. | |
| 6,873,317 B1 | 3/2005 | Griffin et al. | |
| 6,891,529 B2 | 5/2005 | Ladouceur et al. | |
| 6,918,707 B2 | 7/2005 | King et al. | |
| 6,919,879 B2 | 7/2005 | Griffin et al. | |
| 6,921,221 B2 | 7/2005 | King et al. | |
| 6,923,583 B2 | 8/2005 | King et al. | |
| 6,924,789 B2* | 8/2005 | Bick | 345/168 |
| 6,933,927 B2 | 8/2005 | Lu | |
| 6,950,988 B1 | 9/2005 | Hawkins et al. | |
| 6,981,791 B2 | 1/2006 | Higashiyama | |
| 7,027,036 B2* | 4/2006 | Yang | 345/170 |
| 7,129,433 B2 | 10/2006 | Tokusashi | |
| 7,158,147 B2 | 1/2007 | Watson et al. | |
| 7,206,599 B2 | 4/2007 | Lemley | |
| 7,216,588 B2 | 5/2007 | Suess | |
| 7,227,536 B2 | 6/2007 | Griffin et al. | |
| 7,250,937 B2 | 7/2007 | Takagi | |
| 7,265,745 B1 | 9/2007 | Kling | |
| 7,324,091 B2 | 1/2008 | Fyke | |
| 7,502,462 B2 | 3/2009 | Rak et al. | |
| 7,829,803 B2 | 11/2010 | Babella | |
| 8,373,663 B2 | 2/2013 | Skillman et al. | |
| 8,525,794 B2 | 9/2013 | Skillman | |
| 2002/0021562 A1 | 2/2002 | Tholin et al. | |
| 2002/0021935 A1 | 2/2002 | Li | |
| 2002/0025837 A1 | 2/2002 | Levy | |
| 2002/0030987 A1* | 3/2002 | Saito et al. | 362/84 |
| 2002/0044136 A1 | 4/2002 | Griffin | |
| 2002/0079211 A1 | 6/2002 | Katayama et al. | |
| 2002/0149567 A1 | 10/2002 | Griffin et al. | |
| 2002/0175899 A1* | 11/2002 | Yang | 345/169 |
| 2002/0196618 A1 | 12/2002 | Douzono et al. | |
| 2002/0196619 A1* | 12/2002 | Chou | 362/85 |
| 2003/0031025 A1 | 2/2003 | Huizenga | |
| 2003/0050019 A1 | 3/2003 | Dowling et al. | |
| 2003/0054854 A1 | 3/2003 | Kela et al. | |
| 2003/0063087 A1 | 4/2003 | Doyle et al. | |
| 2003/0112620 A1 | 6/2003 | Prindle | |
| 2003/0156381 A1 | 8/2003 | Lieu et al. | |
| 2004/0165924 A1 | 8/2004 | Griffin | |
| 2005/0105256 A1 | 5/2005 | Chuang | |
| 2005/0140653 A1 | 6/2005 | Pletikosa et al. | |
| 2005/0174334 A1 | 8/2005 | Hannay | |
| 2005/0216278 A1 | 9/2005 | Eisen | |
| 2005/0248537 A1 | 11/2005 | Kim et al. | |
| 2005/0259069 A1 | 11/2005 | Baker et al. | |
| 2006/0033704 A1 | 2/2006 | Ladouceur et al. | |
| 2006/0146027 A1 | 7/2006 | Tracy et al. | |
| 2006/0202966 A1 | 9/2006 | Skillman | |
| 2006/0202967 A1 | 9/2006 | Skillman et al. | |
| 2006/0202968 A1 | 9/2006 | Skillman et al. | |
| 2006/0204303 A1 | 9/2006 | Yurochko et al. | |
| 2006/0262095 A1 | 11/2006 | Ladouceur et al. | |
| 2007/0256915 A1 | 11/2007 | Levy | |
| 2008/0060928 A1 | 3/2008 | Babella | |

FOREIGN PATENT DOCUMENTS

| | | |
|---|---|---|
| EP | 1143327 A1 | 10/2001 |
| EP | 1 156 643 A2 | 11/2001 |
| EP | 1 172 989 | 1/2002 |
| EP | 1 197 835 | 4/2002 |
| EP | 1 265 261 | 12/2002 |
| EP | 1585153 A1 | 10/2005 |
| EP | 1619705 A1 | 1/2006 |
| JP | 2001126588 | 5/2001 |
| WO | WO81/02272 | 8/1981 |
| WO | WO-92/22864 | 12/1992 |
| WO | WO96/27256 | 9/1996 |
| WO | WO 99/37025 A1 | 7/1999 |
| WO | WO 00/30381 A1 | 5/2000 |
| WO | WO03/007582 | 1/2003 |
| WO | WO2004/001578 | 12/2003 |
| WO | WO2004/059955 | 7/2004 |

OTHER PUBLICATIONS

HP iPAQ H4350 Keypad Structure, Mar. 3, 2008, 7 pages.
International Search Report and Written Opinion of the International Searching Authority in International Application PCT/US2006/008615, European Patent Office, Mar. 23, 2007, 21 pages.
International Preliminary Report on Patentability; Written Opinion of the International Searching Authority; European Patent Office; Sep. 27, 2007; PCT/US2006/008615; 13 pages.
International Search Report and Written Opinion of the International Searching Authority in International Application PCT/US2006/021217, European Patent Office, May 2, 2007, 8 pages.
Final Office Action dated Jul. 15, 2008 in U.S. Appl. No. 11/114,908, 15 pgs.
International Preliminary Report on Patentability; Written Opinion of the International Searching Authority; European Patent Office; PCT/US2006/008615, Sep. 27, 2007, 15 pages.
Non-Final Office Action dated Jun. 19, 2008 in U.S. Appl. No. 11/115,032, 12 pgs.
Non-Final Office Action dated Jan. 30, 2008 in U.S. Appl. No. 11/114,908, 12 pgs.
Non-Final Office Action dated Jun. 6, 2008 in U.S. Appl. No. 11/114,941, 15 pgs.
Notice of Allowance for U.S. Appl. No. 12/395,535 mailed on May 24, 2013.

* cited by examiner

STACK ASSEMBLY FOR IMPLEMENTING KEYPADS ON MOBILE COMPUTING DEVICES

TECHNICAL FIELD

The disclosed embodiments relate generally to the field of keypads for mobile computing devices. In particular, the disclosed embodiments relate to a stack assembly for implementing a keypad on a mobile computing device.

BACKGROUND

Over the last several years, the growth of cell phones and messaging devices has increased the need for keypads that are small and tightly spaced. In particular, QWERTY keypads have become smaller with greater key switch density. With decreasing overall size, there has been greater focus on efforts to make individual keys more usable to a user. For example, keyboard design considers how readily the user can select or click ("clickability") individual key structures of keyboard. The clickability may be affected by various factors, such as the individual key structure size and shape, as well as the spacing between key structures and the tactile response of individual key structures.

Other features that may affect usability include illumination of the keypad. Smaller keyboards tend to have smaller print patterns, and thus are more difficult to see. Some of the solutions provided for illuminating key pads includes using incandescent light sources and lighting areas surrounding individual key structures. The need for illumination becomes more important with small and/or tightly spaced key structures, because the smaller keys are more difficult to see. Furthermore, the smaller keyboards tend to be more unfamiliar to users who may be use to full-size keyboards, and many users have difficulty typing without seeing the individual key structures.

DETAILED DESCRIPTION

Embodiments of the invention provide an modular or integrally assembled stack for use with keyboards on mobile computing devices.

Overview

Embodiments of the invention include a stack assembly for use with a mobile computing device. In one embodiment, the stack assembly includes an electrical contact layer, and actuation member layer, and an illumination layer. The electrical contact layer includes a plurality of contact elements. The actuation member layer includes a plurality of actuation members are, wherein each actuation member is aligned so that an axial movement of that member causes a corresponding one of the plurality of contact elements to actuate. The illumination layer is configured to emit light to the keypad.

As used herein, the term "axial" movement also means vertical movement, or movement in a direction that is inward with respect to a housing of the mobile computing device.

Examples of a mobile computing device include cell phones, personal digital assistants (e.g. PALM TUNGSTEN devices manufactured by PALMONE, INC.), and messaging and/or cellular phones (e.g. HANDSPRING TREO devices manufactured by PALMONE, INC). However, mobile computing device may include any device that is generally portable with one hand and/n a person's pocket.

The term "layer" refers to an occupied thickness. A layer may include more than one type of material, including sub-layers (e.g. underlying film).

In another embodiment, a mobile computing device is provided having a housing, one or more processors contained within the housing, and a keyboard comprising a plurality of key structures provided on a surface of the housing. Additionally, a modular stack assembly may be contained within the housing and operatively engaged with the keyboard to enable each of the plurality of key structures to be operated to register input with the one or more processors.

The terms "integral" or "integrally combined" mean that elements or components are combined to form a single or modular unit. For example, different materials and fabrication processes may be used to integrally form a stack, but after its formation, the stack may be treated as a single or modular unit.

The term "operatively engaged" means that two elements are coupled in a manner that is operative, assuming electrical power is provided if needed for operation of the coupled elements.

Throughout this application, numerous references are made to measurements, such as distances and positions. The use of language, such as "about" or "approximately", is used to define or quantify such measurements should be assumed to have some margin of variation (e.g. plus/minus 5%) as deemed practical given the context of the usage.

Components of Modular Stack Assembly

Figure 1:
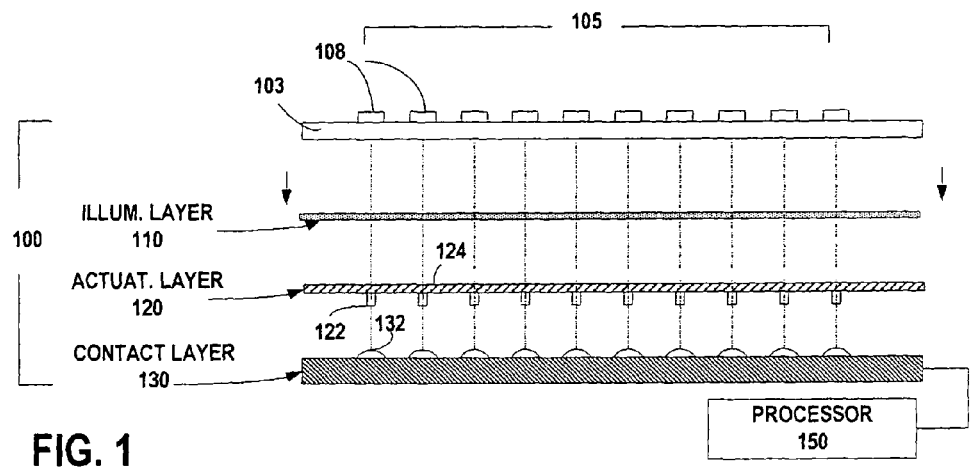
FIG. 1 illustrates basic components of a stack assembly for use with a keypad or keyboard of a mobile computing device.

FIG. 1 illustrates basic components of a stack assembly for use with a keypad or keyboard of a mobile computing device. A stack 100 includes an illumination layer 110, an actuation member 120, and an electrical contact layer 130. FIG. 1 illustrates one simplified arrangement for the layers, with illumination layer 110 provided most proximate a surface of a housing 103 on which key structures 108 of a keyboard 105 (or other type of keypad set) are provided. The key structures 108 may be extended from the housing 103 through corresponding openings or apertures formed in the housing. The stack 100 electronically interconnects or interfaces the keypad 105 with a processor 150 or processing resources of the mobile computing device.

The illumination layer 110 includes lighting resources that illuminate the keyboard 105, or at least individual key structures 108 in the keyboard 105. The electrical contact layer 130 provides individual contact elements 132 that are electrically interconnected via a printed circuit board, flex circuit, or other mechanism, to processing resources of the mobile computing device. Each contact element 132 may be assigned to one of the key structures 108. The actuation member layer 120 includes individual actuation members 122 that are aligned with a corresponding contact element 132 and key structure 105. Each individual actuation member 122 travels with insertion of the corresponding key structure 105 into the corresponding contact element 132, causing that contact element to be switched or otherwise actuated. The result is that the processing resources of the mobile computing device are provided a signal corresponding to insertion of the particular key structure 108.

While FIG. 1 illustrates a particular order of placement of the layers in the stack 100, other arrangements and ordering of the different layers of the stack are possible. In addition, other components may comprise the stack 100. Some of these arrangements are described below.

In an embodiment shown by FIG. 1, each layer may be fixed, joined or statically placed to an adjacent layer, so that the layers that form the stack assembly or integrally combined. The integral formation of the stack 100 means that the stack assembly can be treated as single unit, or as a module. As such, it is possible for the stack 100 to be assembled separately from other components of a mobile computing device. For example, stack 100 may be assembled as part of an original equipment manufacture (OEM) process. Subsequently, stack 100 may be inserted as a modular component into the housing of the mobile computing device during a separate manufacturing or assembly process.

Numerous mechanisms and means may be employed in order to affix or statically interconnect the different layers of the stack 100. For example, embodiments described below employ adhesives to affix one layer of the stack 100 to another layer. Other mechanisms, such as mechanical fasteners (e.g. screws, clips, snap-on couplings) may also be employed to secure one layer with another.

The placement of each layer that forms the stack 100 may align to enable each key structure 108 to be insertable and cause the corresponding element 132 on the electrical contact layer 130 to actuate. The actuation members 122 enable key structure insertion and/or travel to translate into actuation of the corresponding electrical element 132. The electrical contact layer 130 and the actuation member layer 120 may be aligned so that each key structure 108 of the mobile computing device is insertable to effectuate an input with processor 150. The processor 150 may correlate the electrical contact element 132 switched with the corresponding input. The illumination layer 110 may also be aligned with the key structure 108 so that light-emitting sources align with corresponding key structures 108. According to an embodiment, alignment structures and mechanisms may be used to align the layers of the stack 100 during its formation. For example, alignment pins and pin holes, ridges, and/or optical markers may be used to align one of the layers in the stack assembly 150 with an adjoining layer.

Illumination Layer

The illumination layer 110 illuminates the keyboard 105 from within the housing 103 of the mobile computing device. The illumination layer 110 provides a medium on which light-emitting material or elements are provided. In one implementation, at least some of the key structures 108 forming the keyboard 105 may be made of translucent materials so that illumination from within the housing 103 results in the key structures being illuminated to the user. In another implementation, regions in the keyboard 105, such as around perimeters of individual key structures, may be illuminated.

According to one embodiment, the illumination layer 110 is formed from electroluminescent (EL) material. The EL material illuminates may uniformly (or substantially thereof) illuminate across at least one or more regions of the illumination layer 110. One result that can be achieved is that the keyboard 105 may be sufficiently uniformly lit to avoid dark spots or darkened key structures 105.

In another embodiment, the illumination layer 110 may be formed from another type of lighting source. In one embodiment, the illumination layer 110 may comprise a carrier that is provided discrete light sources, such as light-emitting diodes (LEDs). The carrier of the illumination layer 110 may be formed from any material capable of carrying the light sources and the electrical conductivity to those sources. The LEDs may be patterned on the surface of the illumination layer 105 to illuminate the individual key structures 105 from underneath. Various patterns may be used to distribute the LEDs on the illumination layer 110. Furthermore, other types of illumination sources may be used, such as incandescent light sources.

Actuation Member Layer

Figure 2A:
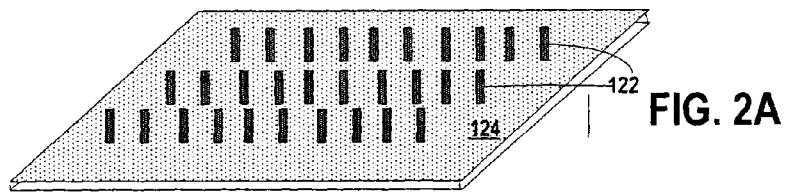
FIG. 2A illustrates an actuation member for use with a stack, under an embodiment of the invention.

FIG. 2A illustrates a general design for the actuation member layer 120, according to an embodiment of the invention. Reference is made to elements of FIG. 1 for context. The actuation member layer 120 includes a carrier 124 from which the plurality of actuation members 122 are provided. As illustrated by FIG. 1, each actuation member 122 is aligned with a corresponding key structure 108 and a corresponding contact element 132 of the electrical contact layer 130. When a given key structure 108 travels inward, that key structure 108 may direct the corresponding actuation member 122 into the contact element. In one implementation, the actuation members 122 extend inward from the carrier 124 towards corresponding contact elements 132 of the electrical contact layer 130. However, it is also possible for a portion of the overall length of each member 122 to extend upward towards the key structure 108.

In an embodiment such as shown by FIG. 2, the carrier 124 may extend under the keypad 105 to provide individual actuation members for each key structure 108. The carrier 124 enables the actuation members 122 to be separately formed from the key structures 108 and the electrical contact layer 130. This is in contrast to some past approaches, where actuation members are formed as part of the key structure 108, such as through extensions formed off of the bottom surfaces of the key structures. The carrier 124 may be aligned and affixed to the electrical contact layer 130 as part of an assembly process for the overall stack 100. Subsequently, the carrier 124 may be aligned with the keyboard 105 of the mobile computing device in a separate assembly process.

According to an embodiment, the individual actuation members 122 may be formed to be substantially more rigid than the carrier 124. In one embodiment, the carrier 124 is made from an elastomer or other flexible or compliant membrane to reduce resistance to inward travel by the actuation members 122, and the actuation members 122 are made rigid to be responsive to a user inserting the corresponding key structure. An example of a construction for the carrier 124 is a thin sheet of silicon-rubber.

Figure 6:
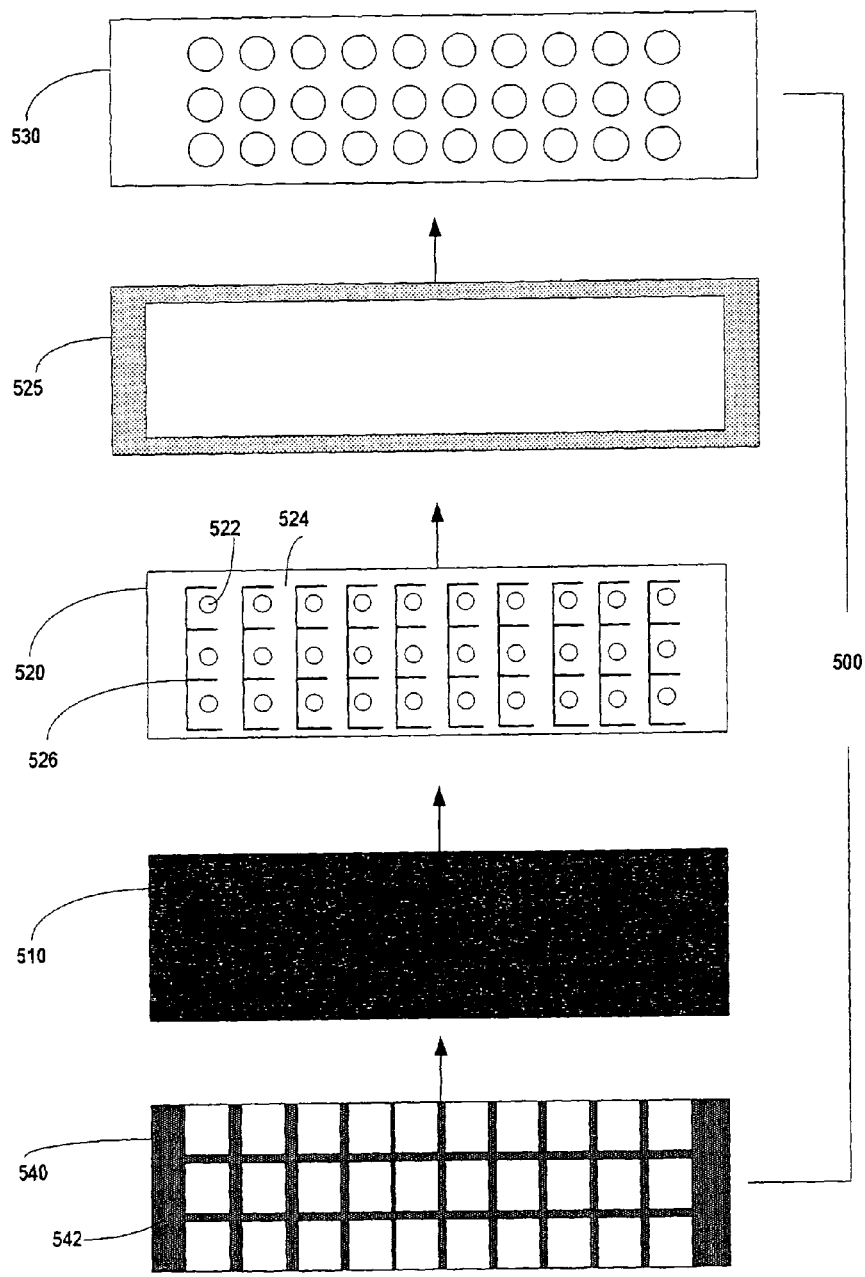
FIG. 6 is a frontal view of the different layers and elements that can be used to integrally form a modular stack, under an embodiment.

As described in FIG. 6, slits or cuts may be formed onto the carrier 124 in order to enhance the flexibility of the carrier 124. For example, three cuts may partially surround each member 122. The cuts lessen the overall resistance provided by the carrier 124 when the key structure 108 directs the member 122 inward.

As will be described in greater detail with FIGS. 7A-7E, different techniques for forming the actuation member layer 120 may be employed. In one embodiment, the actuation member 122 and the carrier 124 are formed from an elastomer such as silicon-rubber or polycarbonate materials. In another embodiment, the carrier 124 and the individual actuation members 122 are formed from different materials that may be combined or otherwise joined, such as the silicon-rubber and hard plastic respectively. As further described by FIGS. 7A-7E, various techniques may be used to form the actuation member layer 120 independent of the other layers in the stack 100. For example, a co-molding process may be used to mold the hard or rigid material of the actuation member 122 with the flexible material of the carrier. As another example, the actuation members 122 may be separately joined to the carrier 124 using adhesives or other forms of chemical bonds.

In one embodiment, an overall area of the actuation members 122 is smaller than a footprint of the corresponding contact element 132. In one implementation, the ratio of a diameter of the actuation member 122 to a diameter of the corresponding contact element 132 is less than 1:2, and preferably of the range of 1:4. An overall length of the actuation member 122 is sufficient to actuate the corresponding contact element 132. In one implementation, this length is about 0.5 mm. In an implementation such as described with FIG. 2B, where contact elements 132 are snap-domes, the overall height needed is about 0.3 mm, corresponding to the separation of the outer contact surface 135 (FIG. 2B) from the inner surface 136 (FIG. 2B).

Electrical Contact Layer

In an embodiment, the electrical contact layer 130 includes a substrate 134, such as a printed circuit board or a flex circuit, on which the electrical contact elements 132 are provided. Circuitry provided by the substrate 134 may interconnect the electrical contact elements 132 with the processor of the mobile computing device.

Figure 2B:
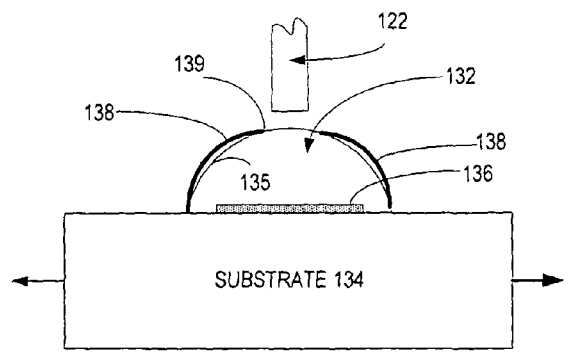
FIG. 2B illustrates a design for a electrical contact layer, under an embodiment of the invention.

FIG. 2B illustrates one of the electrical contact elements 132 provided on the substrate 134. In an embodiment such as shown by FIG. 1, the electrical contact elements 132 is snap-dome contact, having an outer contact surface 135 and an interior contact 136. The outer contact surface 135 may bend or curve outward over the interior contact 136. The outer contact surface 135 and the interior contact 136 may form a switch that can be actuated. In the absence of an external force, the switch is in an open state. Contact by the corresponding actuation member 122 causes the outer contact surface 135 to collapse inward, thereby making contact with the interior contact 136. When the stack is powered, this contact closes the switch formed by the outer contact surface and the interior contact 136. The result is that the processor is signaled a "key-down" event that indicates insertion of the corresponding key structure 108.

One advantage provided by the snap-dome construction is that the user is provided a tactile sensation when actuation occurs. This sensation is in the form of a "snap", felt with the collapse of the outer contact surface 135. In the context of a mini-keyboard, the sensation informs the user that a key-down event was registered, so that the user can concentrate on viewing the key structures, and not the display of the mobile computing device.

FIG. 2B illustrates the contact element 132 partially covered with a sheath layer 138. The sheath layer 138 is commonly used to enhance the tactile response that would otherwise be generated from the collapse of the outer contact surface 135. Typically, the sheath layer 138 is formed from a material such as MYLAR, which is semi-rigid but collapsible. The sheath layer 138 is normally affixed over an entire surface of the outer contact area 135. The actuation member 122 may make contact with the sheath layer 138 to cause the collapse of both the sheath layer and the outer contact surface 135, thereby enhancing the snap response for the user.

In an embodiment shown by FIG. 2B, the sheath layer 138 may include an opening 139 to receive the corresponding actuation member 122. In this way, the actuation member 122 makes direct contact with the outer surface 135, rather than with the sheath layer 138. Less resistance is thus provided to the actuation member 122 in making the snap-dome contact snap. However, the sheath layer 138 may be affixed to the outer contact surface 135 so that inward movement of that surface causes the sheath layer 138 to further enhance the snap-sensation. Thus, the enhanced tactile sensation provided by the sheath layer 138 may be preserved, while less resistance is given to the user inserting the corresponding key structures.

Modular Stack Implementations

Figure 3A:
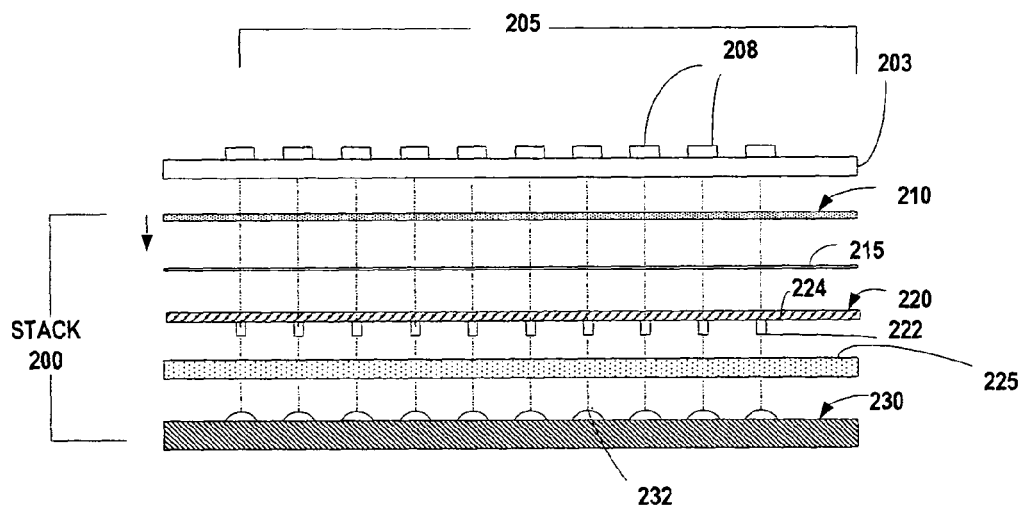
FIGS. 3A and 3B illustrate a stack formation, under an embodiment of the invention.
Figure 3B:
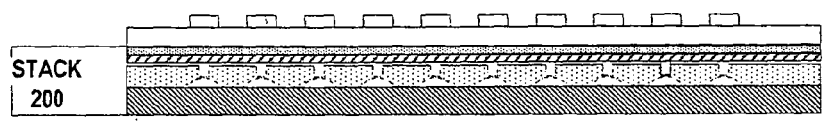

FIGS. 3A and 3B illustrate a stack formation, under an embodiment of the invention. In FIG. 3A an exploded view of a stack 200 is illustrated. The exploded view illustrates the different elements that can be used to form an assembled and modular stack 200. The stack 200 may be placed underneath a keyboard 205 comprising a plurality of key structures 208. In the example provided, ten key structures 208 are shown to simulate a row of a QWERTY keyboard.

In an embodiment shown by FIG. 3A, stack 200 includes an illumination layer 210 positioned proximate to the keyboard 205, an actuation member layer 220 provided underneath the illumination layer 210, and an electrical contact layer 230 provided underneath the actuation member layer 220. FIGS. 1, 2A and 2B illustrate suitable constructions and implementations of the illumination layer 210, actuation member layer 220, and electrical contact layer 230, under an embodiment. More specifically, actuation member layer 220 may include a carrier 224 on which a plurality of actuation members 222 are provided. The electrical contact layer 230 may include a substrate 234 having a plurality of electrical contact elements 232. As with previous embodiments, one type of electrical contact elements 232 that can be employed are "snap-dome" contact elements. Additional information for construction and formation of the actuation member layer 220 is provided with FIG. 6 and FIG. 7A-7E.

In an embodiment, the illumination layer 210, the actuation member layer 220, and the electrical contact layer 230 are aligned and affixed to one another. According to an embodiment, a thin adhesive layer 215 affixes the actuation member layer 220 to the illumination layer 210, and a thick adhesive layer 225 affixes the actuation member layer 220 to the electrical contact layer 230. In one implementation, the thin adhesive layer 215 is adhesive tape or film, such as VHB type adhesives manufactured by 3M. A thickness of the thin adhesive layer may range between 0.025 mm and 0.2 mm, and more preferably between 0.05 mm and 0.1 mm. In an embodiment, the thick adhesive layer 225 may be positioned on the perimeter of the substrate 134 and/or actuation member layer 220, so as to not contact any of the contact elements 232 or actuation members 222. A suitable thickness for the thick adhesive layer 225 may range between 0.3 mm and 1.0 mm, and more preferably at about 0.8 mm. A suitable type of adhesive for this layer may be open cell foam adhesive, such as high-density open cell urethane foam with acrylic adhesive manufactured by 3M.

In one embodiment, the illumination layer 210 is formed from EL material. Placement of the illumination layer 210 directly underneath the key structures 208 permits maximum light output through the keypad 205 and individual key structures 208. In one implementation, the key structures 208 may be formed from translucent or clear material, so as to act as light pipes that emit light from the illumination layer 210.

FIG. 3B is a side cross-sectional view that illustrates the placement of the assembled stack 200 within a housing 203 of a mobile computing device. Each layer that forms the stack 200 is affixed to the adjacent layers. The thick adhesive layer 225 may circumvent an interior region where the actuation members 222 are positioned in contact or just above the electrical contact elements 232. The alignment of layers that comprise the stack 200 may be rigidly maintained, while the key structures 208 have limited lateral movement over the stack 200. In one embodiment, stack 200 is employed with the keypad 205 floating over it. The keypad may include a carrier formed from a flexible membrane, such as an elastomer (e.g. silicon rubber). The key structures 208 may be molded onto the carrier of the key structures, and positioned within the housing to float over the stack 200. The floating keypad 205 means that individual key structures 208 have ability to move laterally, such as when contact by the finger or stylus of the user is received. The carrier of the key structures may extend just under the housing 203, and each key structure 208 may extend from the housing through a corresponding opening or aperture, so that insertion of the key structure into the aperture causes the corresponding actuation member 222 to inwardly travel and actuate the corresponding electrical contact element 232.

Figure 4A:
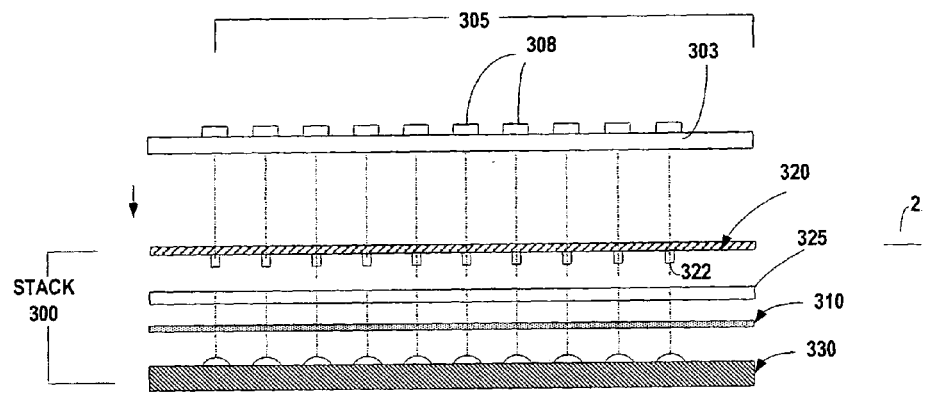
FIGS. 4A and 4B illustrate an alternative design for a stack, under an embodiment of the invention.
Figure 4B:
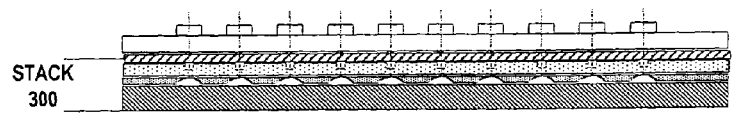

FIGS. 4A and 4B illustrate an alternative design for a stack 300, under an embodiment of the invention. As with previous embodiments, stack 300 includes an illumination layer 310, an actuation member layer 320, and an electrical contact layer 330. However, the respective layers are ordered differently than compared to some of the other embodiments described herein. In an embodiment such as shown by FIG. 4A, the illumination layer 310 is positioned to overlay the electrical contact layer 330. The illumination layer 310 and the electrical contact layer 330 may be separately attached using adhesives. The actuation member layer 320 is positioned over the illumination layer 310 and proximate to the housing 203. In order to enable keypad 305 to be illuminated from the illumination layer 310, an embodiment forms at least a carrier 324 of the actuation member layer 320 from translucent, clear, or semi-clear (e.g. white translucent) material that illuminates with light. A thick adhesive layer 325 may affix the actuation member layer 320 to the combined illumination layer 310 and electrical contact layer 330.

In one embodiment, the illumination layer 310 is formed from EL material. By overlaying the electrical contact layer 330, the illumination layer 310 may make contact with discrete points on a substrate 334 of the electrical contact layer 330, as well as with portions of at least some of the contact elements 332. In an embodiment such as shown with FIG. 2B, where the contact-elements 332 are snap-domes, the illumination layer 310 may overlay and contact the sheath layer 138 (FIG. 2B). The actuation members 322 may push against the illumination layer 310 in order to cause the snap-dome contact element to switch. It is possible for an opening in the illumination layer 330 to be provided in alignment with the opening 139 (FIG. 2B) of the sheath layer 138 in order to accommodate the corresponding actuation member 222.

FIG. 4B illustrates the assembled stack 300, placed within a housing 303 of a mobile computing device. The 300 may be tightly aligned and formed as a separate component for the mobile computing device. As with an embodiment of FIGS. 3A and 3B, a keypad 305 may be formed from its own combination of a carrier and key structures 308. The carrier of the key structures may extend under the housing 303 of the mobile computing device. The key structures 308 may be molded, joined or otherwise formed on the carrier and extended over the housing 303. The keypad 305 may float over the stack 300, with the openings in the housing 303 acting as insertion guides for each key structure 308 when it is inserted. As described elsewhere, each key structure 308 may align with a corresponding actuation member 322 and a corresponding contact element 332.

Even with use of a translucent material for the carrier 324 of the actuation member layer 320, the placement of the illumination layer 310 directly over the contact element layer 330 reduces the amount of lighting emitted for the keypad 305, when compared to an embodiment such as shown by FIGS. 3A and 3B. However, combining the illumination layer 310 with the electrical contact layer 330 enables the combined layers to be readily integrated with the actuation member layer 320. Precise alignment and assembly is required only for the combined layer, the adhesive layer 325, and the actuation member layer 320. Assembly requirements are thus reduced, enabling the stack 300 to be made with less expense and effort.

Figure 5A:
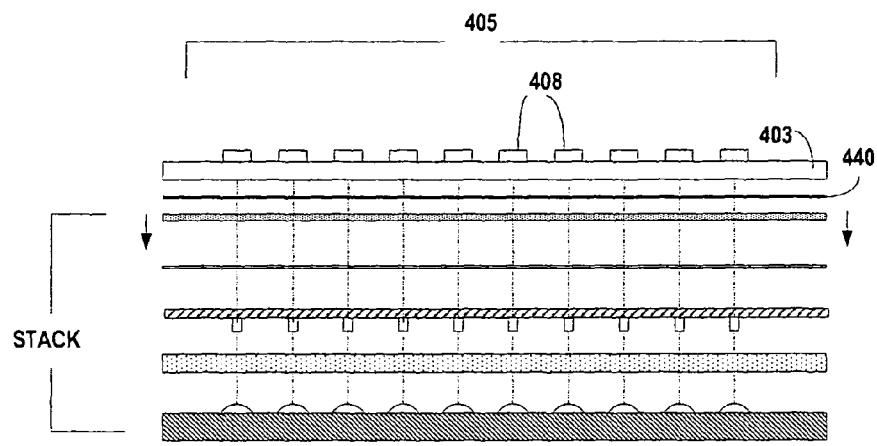
FIGS. 5A and 5B illustrate an alternative construction in which a mask is combined with an illumination layer 410 as part of a stack formation, under an embodiment of the invention.
Figure 5B:
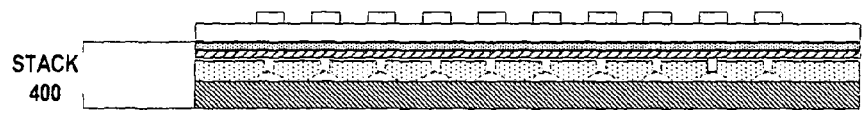

FIGS. 5A and 5B illustrate an alternative construction in which a mask 440 is combined with an illumination layer 410 within a stack 400. FIG. 5A is an exploded view of a stack design similar to an embodiment shown with FIGS. 3A and 3B. The stack 400 includes an illumination layer 410 placed over an actuation member layer 420. The actuation member layer 420 may be placed over the electrical contact layer 430. However, in contrast to an embodiment such as described with FIGS. 3A and 3B, the mask 440 is superimposed on the illumination layer 410 just underneath a housing 403 of the mobile computing device. An example of how mask 440 can be constructed is shown with FIG. 6. The mask 440 serves to shade or block light from being emitted from diffusing. Rather, light may be focused to emit only from translucent key structures 408, or from space in the opening of the hosing where that key structure is provided. The result is that the lighting provides better contrast for regions that are desired to be lit, and less light to regions where the lighting is a distraction.

It is possible for an embodiment to use mask 440 with an illumination layer that is combined or overlaid with the electrical contact layer, as described with embodiments of FIGS. 4A and 4B. However, in an embodiment where there is an intervening layer (e.g. actuation member layer 320 in FIG. 4A and FIG. 4B), the effectiveness of using the mask 440 is reduced.

FIG. 6 is a frontal view of the different layers and elements that can be used to integrally form a modular stack 500, under an embodiment. An embodiment shown assumes the stack 500 is for use with a thirty key keypad, such as found with many small-form factor computing devices using QWERTY keyboard layouts. More or fewer keys, and different keyboard configurations may be used to take advantage of the modular stack 500. For example, the stack 500 may accommodate 9-12 keys for a standard numerical keypad found on the typical cell phone. For purpose of description, an order or arrangement as shown and described by an embodiment of FIGS. 5A and 5B is assumed when describing embodiments of FIG. 6.

In an embodiment shown, a stack may be assembled to include an illumination layer 510, an actuation member 520, a thick adhesive layer 525, an electrical contact layer 530, and a mask 540. As described with other embodiments, the illumination layer 510 may be formed from EL material. Alternatively, the illumination layer 510 may be formed from discrete light sources, such as LEDs or other forms of light emitting mechanisms.

The actuation member layer 520 may comprise the carrier 524 and a plurality of actuation members 522 that extend away from the key structures in use. The carrier 524 may be designed for maximum flexibility, while the actuation members 522 may be structured to be rigid. To this end, the carrier 524 may be formed from a flexible material and be provided slits 526 about individual actuation members 522 in order to facilitate those actuation members to travel inward more freely. The particular slit configuration shown in FIG. 6 is of design choice, and alternative slit patterns may be employed. For example, L-shaped corner slits about each action member 522 may be used about rather than connected lines that partially circumvent each actuation member.

The adhesive layer 525 may correspond to a perimeter layer that surface mounts to the electrical contact layer 530 and/or the actuation member layer 520. The electrical contact layer 530 may employ snap-dome contact elements for tactile response, as described above. However, other forms of contact elements may also be used, including contact diaphragms and tabs.

In one embodiment, mask layer 540 is formed from a material that blocks the transmission of light. When placed over the illumination layer, light focuses and escapes from cut-outs 542 formed in the mask layer 540. The cut-outs 542 may be shaped to accommodate the shape of the desired illumination. In the case where translucent key structures are employed so that the key structures themselves are illuminated, the shape of the cut-outs may correspond to the shape of the key structures. For example, in FIG. 6, the cut-outs 542 are rectangular in shape to accommodate similarly shaped key structures.

Actuation Member Layer Design and Formation

Various actuation member layers designs and formation techniques may be used to create a carrier on which actuation members may extend. In one embodiment, the carrier of the actuation member may be formed from a film (using polycarbonate or similar material) that is overlaid with silicon-rubber. The silicon-rubber may be shaped to have protrusions in the form of actuation members. The silicon rubber may be molded onto the film and designed to have a minimal thickness in regions other than where the actuation members are formed. The actuation members may extend a length (0.5 mm in one implementation) from the carrier so as to be able to actuate a corresponding contact element with insertion of the key structure. Once the actuation members are formed, the carrier may be die or laser-cut to have a slit pattern that makes the carrier less resistant to movement of the actuation members.

Figure 7:
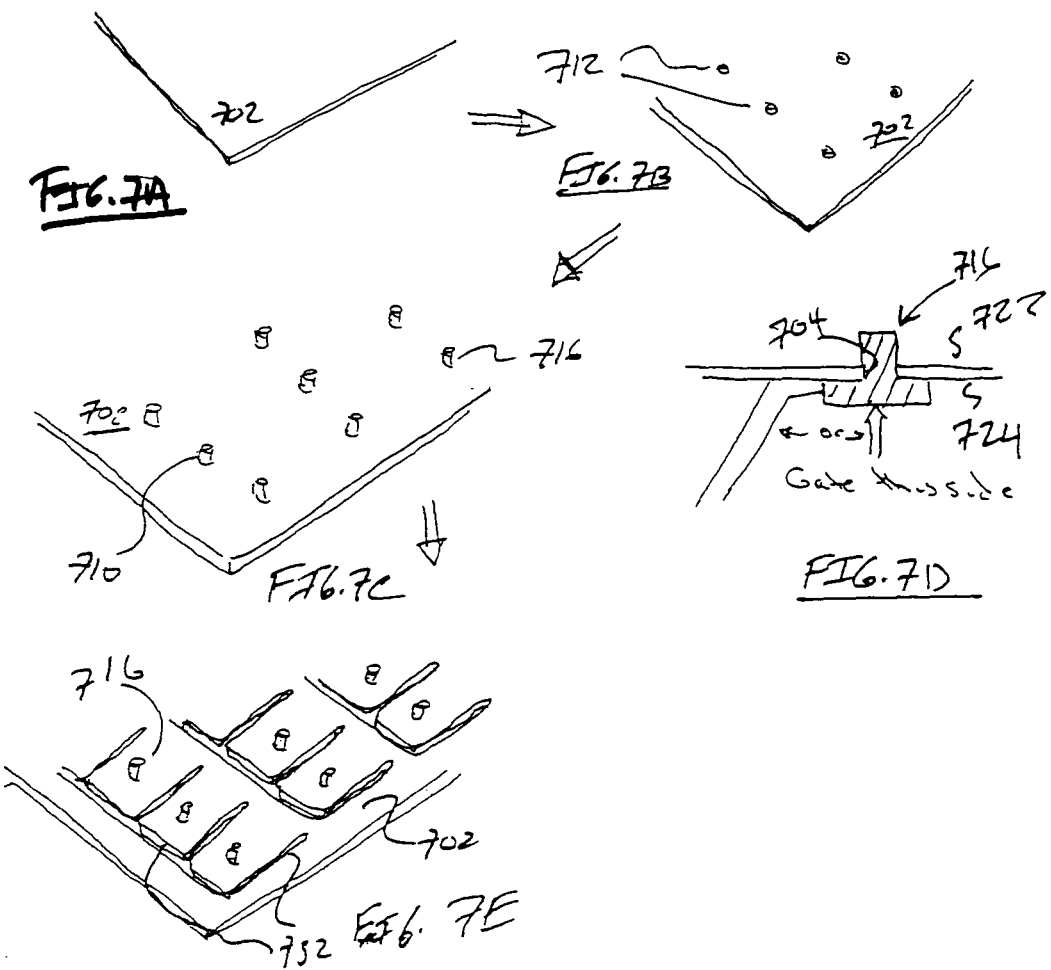
FIGS. 7A-7E illustrate another technique for forming an actuation member layer, under another embodiment of the invention.

FIGS. 7A-7E illustrate another technique for forming an actuation member layer, under another embodiment of the invention. In FIG. 7A, a film 702 is created of a desired dimension and shape. The film 702 may be translucent, and/or colored, white, milky white (via print or ink) or clear. The film 702 may be formed from a flexible material, such as silicon-rubber. In FIG. 7B, holes 712 or fie cut or otherwise formed in the film 702. The holes 712 are positioned where the actuation members are to subsequently be formed. The holes 712 subsequently act as gates for an injection mold that will form the actuation members.

In FIG. 7C, a plurality of actuator members 716 are molded through the film 702. The material used to form the actuation member 716 is formed from a semi-rigid or rigid material, such as hard plastic. Due to the small dimension of the actuation member 716, conventional molding techniques may be unreliable for securely forming and maintaining the actuation member on the film. FIG. 7D illustrates a molding technique for forming the actuation members 716 more securely and reliably. The actuation member 716 may extend out of the underside 722 of the film 702, while the actuation member is gated from the topside 724 of the film. Thus, material used to form the actuation member 716 is injected through the holes 712, using a molding medium angled with the topside 724. FIG. 7D illustrates two possible gate positions for the injection mold. A vertical gate 736 may use a runner oriented vertically with the hole 714 to pass the injection mold onto the underside 722. An edge gate 738 may use a runner oriented at an angle to an edge of the hole 714.

FIG. 7E shows that the film 702 may be cut using, for example, die or laser-cutting, in a pattern that partially circumvents the individual actuation members 716. A resulting slit-pattern 732 enhances the flexibility of the film 702 and reduces the resistance of the actuation members 716 to movement.

In an alternative embodiment, the actuator member 716 may be formed from a material such as hard plastic that is molded on the underside 722 of the film 702. As shown by FIG. 7F, the actuation member 716 may be provided a gate on the underside that results in the actuation member 716 being molded to have a base 742 and an extension 744. The base 742 stabilizes the mold of the plastic, while the extension provides the narrow dimension needed for the contact element. Temperature-sensitive adhesive may be spot-placed on the film at locations where the actuation members are to be extended to assist adhesion of the molding onto the film. The adhesion of the adhesive may be triggered when hot mold for the plastic is placed on the film.

Mobile Computing Device Implementation

Figure 8:
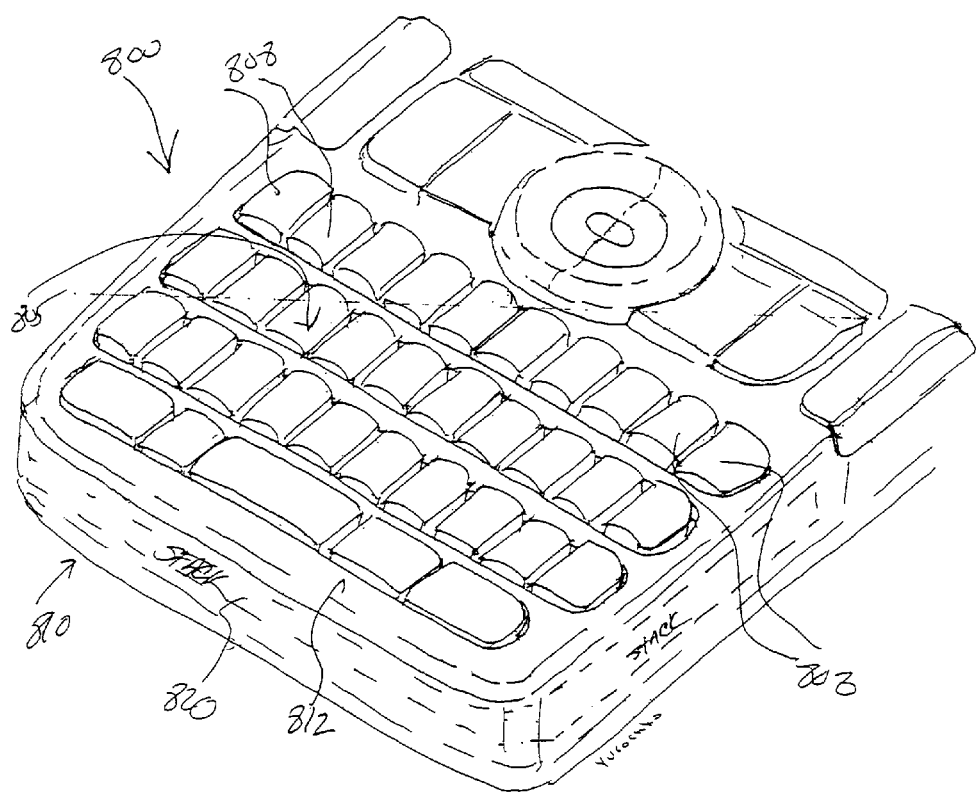
FIG. 8 illustrates an embodiment of the invention implemented within a mobile computing device having a first keyboard design.

FIG. 8 illustrates an embodiment of the invention implemented within a mobile computing device 800. The mobile computing device 800 includes a housing 810 from which a keyboard 805 is provided. Individual key structures 808 comprising the keyboard 805 may be arranged on a front panel 812 of the housing 810. The mobile computing device 800 may employ a QWERTY style keyboard, having at least one key structure for every letter in the alphabet, with additional key structures for spacing and special characters. As such, the keyboard 805 may include over thirty key structures 808, including three rows of key structures having ten keys each.

A stack 820 (shown in phantom) may be maintained within the housing. The stack 820 may be formed according to an embodiment such as described above. As described, stack 820 may include individual actuation members 808 separately formed from the key structures that are responsive to a particular key structure traveling inward into the housing 810. In one embodiment, the stack 800 is integrally combined using techniques such as described with FIGS. 3A, 3B, 4A, 4B, and 5A, 5B. The formation of the stack 820 may occur before the mobile computing device 800 or its keyboard 805 are assembled. As such, the stack 820 may be a modular component that can be inserted into the housing 810 and made to operatively engage the key structures 808.

Figure 9:
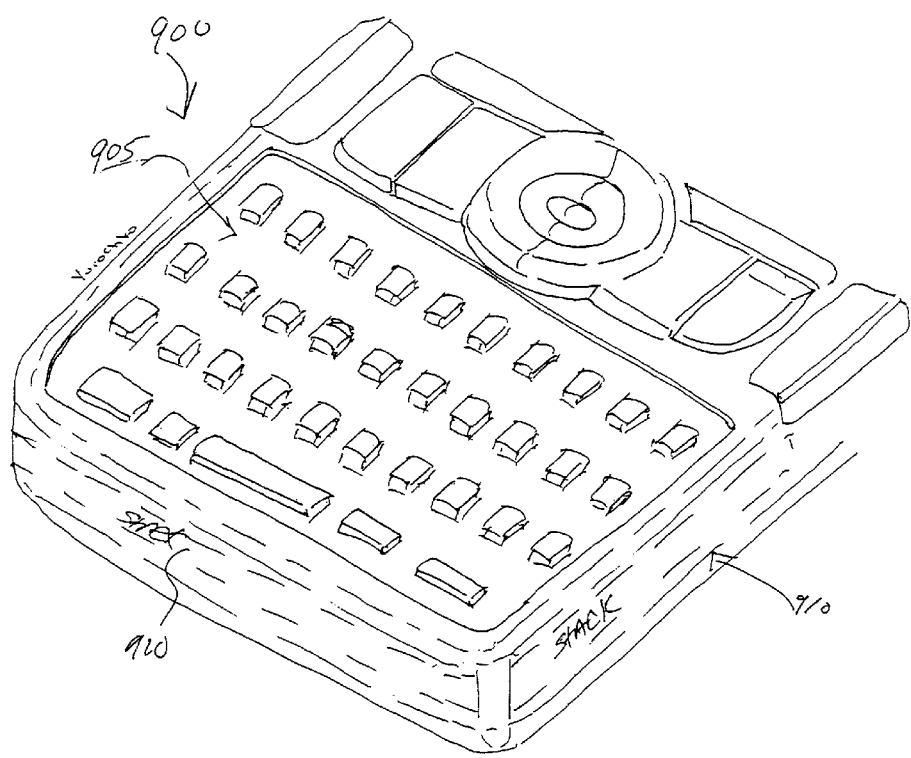
FIG. 9 illustrates an embodiment of the invention implemented within a mobile computing device having a second keyboard design.

In FIG. 8, the keyboard design is to closely space key structures 808 that extend in the row-wise direction. FIG. 9 illustrates a different implementation of a mobile computing device 900 in which a stack 920 is provided, according to an embodiment of the invention. A keyboard layout of the mobile computing device 900 provides individual key structures that are spaced both row-wise and vertically. Despite the variation in key structure spacing, stack 920 may have similar design and dimensions as the stack 820 shown in FIG. 8. The modularity of the stack design enables the use of similar designs in different keyboard layouts, as the case may be.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A modular stack assembly for use as at least a part of a keypad for a mobile computing device, the stack assembly comprising:
    an electrical contact layer on which a plurality of contact elements are provided;
    an actuation member layer on which a plurality of actuation members are provided, wherein each actuation member in the plurality of actuation members extends inward from a corresponding key structure of a key structure layer and is aligned so that an axial movement of that actuation member causes a corresponding one of the plurality of contact elements to actuate; and
    an illumination layer configured to emit light to the keypad, the illumination layer comprising a plurality of discrete light sources that are positioned underneath the actuation member layer and the key structure layer;
    wherein the electrical contact layer, the actuation member layer and the illumination layer are integrally combined to form at least a portion of the modular stack assembly;
    wherein the modular stack assembly is structured to be capable of being combined, as a single unit, with a housing of the mobile computing device during an assembly process for manufacturing the mobile computing device.

2. The stack assembly of claim 1, further comprising the key structure layer that provides the plurality of key structures.

3. The stack assembly of claim 2, wherein at least a thickness at a portion of the key structure layer is translucent.

4. The stack assembly of claim 1, further comprising a first adhesive layer joining the electrical contact layer and the actuation member layer.

5. The stack assembly of claim 4, further comprising a second adhesive layer joining the actuation member layer and the illumination layer.

6. The stack assembly of claim 5, further comprising a mask layer that overlays the illumination layer so as to extend between the plurality of key structures and the illumination layer.

7. The stack assembly of claim 1, wherein the stack assembly is modularly designed to operatively engage a key structure layer of the mobile computing device during the assembly process.

8. The stack assembly of claim 1, wherein the illumination layer comprises electroluminescent material.

9. The stack assembly of claim 1, wherein the illumination layer comprises a plurality of light emitting diodes.

10. The stack assembly of claim 1, wherein the illumination layer is provided between the electrical contact layer and the actuation member layer.

11. The stack assembly of claim 10, further comprising an adhesive layer that joins the illumination layer with the actuation member layer over the electrical contact layer.

12. The stack assembly of claim 1, wherein the plurality of contact elements include a plurality of snap domes.

13. The stack assembly of claim 12, wherein each of the plurality of snap domes comprise an outer contact surface and an interior surface, and each snap dome is aligned to actuate with axial movement of a corresponding actuation member in the plurality of actuation members by having the outer contact surface collapse into the interior surface, and wherein the electrical contact layer further comprises a sheath that overlays a portion of at least some of the contact domes, wherein each of the at least some of the contact domes includes an opening in the sheath to receive the corresponding actuation member.

14. The stack assembly of claim 1, wherein the actuation member layer comprises a carrier and a plurality of actuation members that extend from at least a side of the carrier facing the electrical contact layer.

15. The stack assembly of claim 14, wherein the carrier of the actuation member layer includes a slit pattern.

16. The stack assembly of claim 1, wherein the actuation member layer includes a carrier that retains the plurality of actuation members, and wherein the carrier is formed to be less rigid than the plurality of actuation members.

17. A modular stack assembly for use as at least a part of a keypad of a mobile computing device, the stack assembly comprising:
    an electrical contact layer on which a plurality of contact elements are provided;
    a key structure layer that provides a plurality of key structures;
    an actuation member layer on which a plurality of actuation members are provided, wherein each actuation member in the plurality of actuation members extends inward from a corresponding key structure of a key structure layer and is aligned so that an axial movement of that actuation member causes a corresponding one of the plurality of contact elements to actuate; and
    an illumination layer configured to emit light to the keypad, the illumination layer comprising a plurality of discrete light sources that are positioned underneath the actuation member layer and the key structure layer;
    wherein the electrical contact layer, the actuation member layer, the key structure layer and the illumination layer are integrally combined so as to form at least a portion of the modular stack assembly;
    wherein the modular stack assembly is structured to be capable of being combined, as a single unit, with a housing of the mobile computing device during an assembly process for manufacturing the mobile computing device.

18. The stack assembly of claim 17, further comprising an illumination layer configured to emit light to the key structure layer.

19. The stack assembly of claim 18, wherein the illumination layer is also integrally combined with the electrical contact layer, the actuation member layer and the key structure layer.

20. The stack assembly of claim 19, wherein at least a thickness at a portion of the key structure layer is translucent.

21. The stack assembly of 18, wherein the illumination layer comprises one of (i) electroluminescent material, (ii) a plurality of light emitting diodes, or (iii) a combination thereof.

22. The stack assembly of 17, wherein the key structure layer defines a keyboard.

23. The stack assembly of claim 17, wherein the actuation member layer includes a carrier that retains the plurality of actuation members, and wherein the carrier is formed to be less rigid than the plurality of actuation members.

24. A modular stack assembly for use as at least a part of a keypad for a mobile computing device, the stack assembly comprising:
- an electrical contact layer on which a plurality of contact elements are provided, the plurality of contact elements including a plurality of snap domes;
- an actuation member layer on which a plurality of actuation members are provided, wherein each actuation member in the plurality of actuation members is aligned so that an axial movement of that actuation member causes a corresponding one of the plurality of contact elements to actuate; and
- an illumination layer configured to emit light to the keypad;
- wherein the electrical contact layer, the actuation member layer and the illumination layer are integrally combined so as to form at least a portion of the modular stack assembly;
- wherein the modular stack assembly is structured so as to be capable of being inserted as a single unit into a housing of the mobile computing device during a separate assembly process for the mobile computing device; and
- wherein each of the plurality of snap domes comprise an outer contact surface and an interior surface, and each snap dome is aligned to actuate with axial movement of a corresponding actuation member in the plurality of actuation members by having the outer contact surface collapse into the interior surface, and wherein the electrical contact layer further comprises a sheath that overlays a portion of at least some of the contact domes, wherein each of the at least some of the contact domes includes an opening in the sheath to receive the corresponding actuation member.

* * * * *